(12) United States Patent
Perlman et al.

(10) Patent No.: US 11,148,301 B2
(45) Date of Patent: *Oct. 19, 2021

(54) AUTO-RELEASE VACUUM DEVICE

(71) Applicant: Delaware Capital Formation, Inc., Wilmington, DE (US)

(72) Inventors: Maurice Perlman, Oak Park, MI (US); Keith S. Attee, Charlevoix, MI (US)

(73) Assignee: Delaware Capital Formation, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/840,770

(22) Filed: Apr. 6, 2020

(65) Prior Publication Data

US 2020/0230825 A1 Jul. 23, 2020

Related U.S. Application Data

(63) Continuation of application No. 15/829,058, filed on Dec. 1, 2017, now Pat. No. 10,654,177, which is a (Continued)

(51) Int. Cl.
*B25J 15/06* (2006.01)
*B25B 11/00* (2006.01)
(Continued)

(52) U.S. Cl.
CPC ......... *B25J 15/0625* (2013.01); *B25B 11/007* (2013.01); *B25J 15/0616* (2013.01);
(Continued)

(58) Field of Classification Search
CPC .................. B25J 15/0625; B25J 15/0616; B25J 15/0633; B25J 15/0675; B25B 11/007;
(Continued)

(56) References Cited

U.S. PATENT DOCUMENTS 1,228,690 A 6/1917 Monnet
2,273,679 A 2/1942 Evald
(Continued)

FOREIGN PATENT DOCUMENTS

DE 3516941 11/1986
DE 195 12 700 10/1996
(Continued)

OTHER PUBLICATIONS

U.S. Appl. No. 11/430,712, filed May 9, 2006.
(Continued)

*Primary Examiner* — Jason K Niesz
(74) *Attorney, Agent, or Firm* — Harness, Dickey & Pierce, P.L.C.

(57) ABSTRACT

A vacuum device for a material handling system includes a vacuum device body and a sealing element. The vacuum device body has a vacuum passageway in which a vacuum is generated in response to activation of a pressurized air supply that forces pressurized air through a venturi device. The sealing element moves to a sealing position to substantially seal the vacuum passageway when the air supply is activated, and is urged toward the sealing position via pressurized air that is diverted from an inlet of the vacuum device to the sealing element. The sealing element moves to substantially vent the vacuum passageway when the air supply is deactivated. The vacuum passageway may be in fluid communication with a vacuum cup, which seals against the object when the sealing element is at the sealing position and the vacuum generating device generates at least a partial vacuum in the vacuum passageway.

11 Claims, 8 Drawing Sheets

Related U.S. Application Data continuation of application No. 14/814,708, filed on Jul. 31, 2015, now Pat. No. 9,833,910, which is a continuation of application No. 13/826,756, filed on Mar. 14, 2013, now Pat. No. 9,095,983, which is a continuation of application No. 13/471,882, filed on May 15, 2012, now Pat. No. 8,479,781, which is a continuation of application No. 13/116,037, filed on May 26, 2011, now Pat. No. 8,201,589, which is a continuation of application No. 12/708,854, filed on Feb. 19, 2010, now Pat. No. 7,950,422, which is a continuation of application No. 12/437,677, filed on May 8, 2009, now Pat. No. 7,681,603, which is a continuation-in-part of application No. 11/430,712, filed on May 9, 2006, now Pat. No. 7,540,309.

(60) Provisional application No. 60/698,031, filed on Jul. 11, 2005.

(51) Int. Cl.
  *B65G 47/91* (2006.01)
  *F04F 5/20* (2006.01)
  *F04F 5/52* (2006.01)

(52) U.S. Cl.
  CPC ....... *B25J 15/0633* (2013.01); *B25J 15/0675* (2013.01); *B65G 47/91* (2013.01); *F04F 5/20* (2013.01); *F04F 5/52* (2013.01); *Y10T 137/87893* (2015.04)

(58) Field of Classification Search
  CPC .... B65G 47/91; F05F 5/20; F05F 5/52; Y10T 137/87893
  USPC ................................. 417/65–193; 141/65, 66
  See application file for complete search history.

(56) References Cited

U.S. PATENT DOCUMENTS

| | | | |
|---|---|---|---|
| 2,523,157 A | 9/1950 | Somma | |
| 2,850,279 A | 9/1958 | Stoothoff et al. | |
| 3,033,298 A | 5/1962 | Johnson | |
| 3,152,828 A | 10/1964 | Lytle | |
| 3,181,563 A | 5/1965 | Giffen | |
| 3,223,442 A | 12/1965 | Fawdry et al. | |
| 3,272,549 A | 9/1966 | Nisula | |
| 3,349,927 A | 10/1967 | Blatt | |
| 3,568,959 A | 3/1971 | Blatt | |
| 3,613,904 A | 10/1971 | Blatt | |
| 3,694,894 A | 10/1972 | Jelinek et al. | |
| 3,749,353 A | 7/1973 | Pauliukonis | |
| 3,901,502 A | 8/1975 | Vits | |
| 3,921,971 A | 11/1975 | Vollrath | |
| 3,957,296 A | 5/1976 | Langguth | |
| 3,967,849 A | 7/1976 | Cagle | |
| 3,970,341 A | 7/1976 | Glanemann et al. | |
| 4,006,929 A | 2/1977 | Barker | |
| 4,073,602 A * | 2/1978 | Cagle ........................ | F04F 5/20 294/64.2 |
| 4,121,865 A | 10/1978 | Littwin, Sr. | |
| 4,129,328 A | 12/1978 | Littell | |
| 4,266,905 A | 5/1981 | Birk et al. | |
| 4,432,701 A | 2/1984 | Ise | |
| 4,451,197 A | 5/1984 | Lange | |
| 4,453,755 A | 6/1984 | Blatt et al. | |
| 4,548,396 A | 10/1985 | Nelen | |
| 4,600,228 A | 7/1986 | Tarbuck | |
| 4,662,668 A | 5/1987 | Hufford | |
| 4,708,381 A | 11/1987 | Lundback | |
| 4,747,634 A | 5/1988 | Hoke | |
| 4,762,354 A | 8/1988 | Gfeller et al. | |
| 4,852,926 A | 8/1989 | Littell | |
| 4,957,318 A | 9/1990 | Blatt | |
| 5,029,383 A | 7/1991 | Snyder et al. | |
| 5,172,922 A | 12/1992 | Kowaleski et al. | |
| 5,188,411 A | 2/1993 | Golden | |
| 5,190,332 A | 3/1993 | Nagai et al. | |
| 5,193,776 A | 3/1993 | Nagai et al. | |
| 5,211,435 A | 5/1993 | Nagai et al. | |
| 5,222,854 A | 6/1993 | Blatt et al. | |
| 5,333,456 A | 8/1994 | Bollinger | |
| 5,345,935 A | 9/1994 | Hirsch et al. | |
| 5,609,377 A | 3/1997 | Tanaka | |
| 5,617,338 A | 4/1997 | Sugano | |
| 5,928,537 A | 7/1999 | Fortune | |
| 6,155,796 A | 12/2000 | Schmalz et al. | |
| 6,213,521 B1 | 4/2001 | Land et al. | |
| 6,283,246 B1 | 9/2001 | Nishikawa | |
| 6,318,433 B1 | 11/2001 | Reis et al. | |
| 6,364,054 B1 | 4/2002 | Bubulka et al. | |
| 6,437,560 B1 | 8/2002 | Kalb | |
| 6,454,333 B2 | 9/2002 | Portal | |
| 6,502,877 B2 | 1/2003 | Schick et al. | |
| 6,729,852 B2 | 5/2004 | Schnatterer | |
| 7,540,309 B2 | 6/2009 | Perlman et al. | |
| 7,681,603 B2 | 3/2010 | Perlman et al. | |
| 7,950,422 B2 | 5/2011 | Perlman et al. | |
| 8,201,589 B2 | 6/2012 | Perlman et al. | |
| 8,479,781 B2 | 7/2013 | Perlman et al. | |
| 9,095,983 B2 | 8/2015 | Perlman et al. | |
| 9,347,578 B2 | 5/2016 | Dang | |
| 9,833,910 B2 | 12/2017 | Perlman et al. | |
| 10,654,177 B2 | 5/2020 | Perlman et al. | |
| 2003/0230694 A1 | 12/2003 | Kalb | |
| 2004/0094979 A1 | 5/2004 | Damhuis | |

FOREIGN PATENT DOCUMENTS

| | | |
|---|---|---|
| DE | 198 17 249 | 8/1999 |
| FR | 2547289 | 12/1984 |
| GB | 2 038 282 | 7/1980 |
| JP | 45-30245 | 10/1970 |
| JP | 4624328 | 7/1971 |
| JP | 50-76270 | 7/1974 |
| JP | 51-43765 | 3/1976 |
| JP | 52-129874 | 10/1977 |
| JP | S55-26663 U | 2/1980 |
| JP | 55 051998 | 4/1980 |
| JP | 61-181690 | 11/1986 |
| JP | 03 166200 | 7/1991 |
| JP | 06 254784 | 9/1994 |
| JP | 6-330900 | 11/1994 |
| JP | 2004-293358 | 10/2004 |
| WO | WO 02/04818 | 1/2002 |

OTHER PUBLICATIONS

U.S. Appl. No. 12/437,677, filed Aug. 8, 2009.
U.S. Appl. No. 12/708,854, filed Feb. 19, 2010.
U.S. Appl. No. 13/116,037, filed May 26, 2011.
U.S. Appl. No. 13/471,882, filed May 15, 2012.
U.S. Appl. No. 13/826,756, filed Mar. 14, 2013.
U.S. Appl. No. 14/814,708, filed Jul. 31, 2015.
U.S. Appl. No. 15/829,058, filed Dec. 1, 2017.
PIAB Technical Data Sheet for Quick Release Valve, believed to have been published more than one year prior to the filing date of the present application (1 page).
PIAB Technical Data Sheet for Vacuum Gripper VGS 3010, believed to have been published more than one year prior to the filing date of the present application (2 pages).
Norgren Technical Data Sheets for Heavy Duty Silencers, dated Mar. 1996 (4 pages).
VACCON website (www.vaccon.com) showing information on VACCON silencers, believed to have been published more than one year prior to the filing date of the present application (5 pages).
Automation Products Group Brochure on Modular Vac-Lock Venturi System, dated 1995 (3 pages).
Defendant's Norgren Automation Solutions, Inc.'s Invalidity Contentions, In the United States District Court for the Eastern District

(56) References Cited

OTHER PUBLICATIONS of Michigan, Southern Division, Case No. 5:09-CV-12745-JCO-MKM, Mar. 2, 2010.

Plaintiffs, Delaware Capital Formation, Inc. et al., Complaint and Demand for Jury Trial, In the United States District Court for the Eastern District of Michigan, Southern Division, Case No. 2:10-CV-12254-JCO-VMM, Jun. 8, 2010.

Defendant's Norgren Automation Solutions, Inc.'s First Amended Answer, Affirmative Defenses and Counterclaims to Plaintiff's Complaint, In the United States District Court for the Eastern District of Michigan, Southern Division, Case No. 5:09-CV-12745-JCO-MKM, Jul. 8, 2010.

* cited by examiner

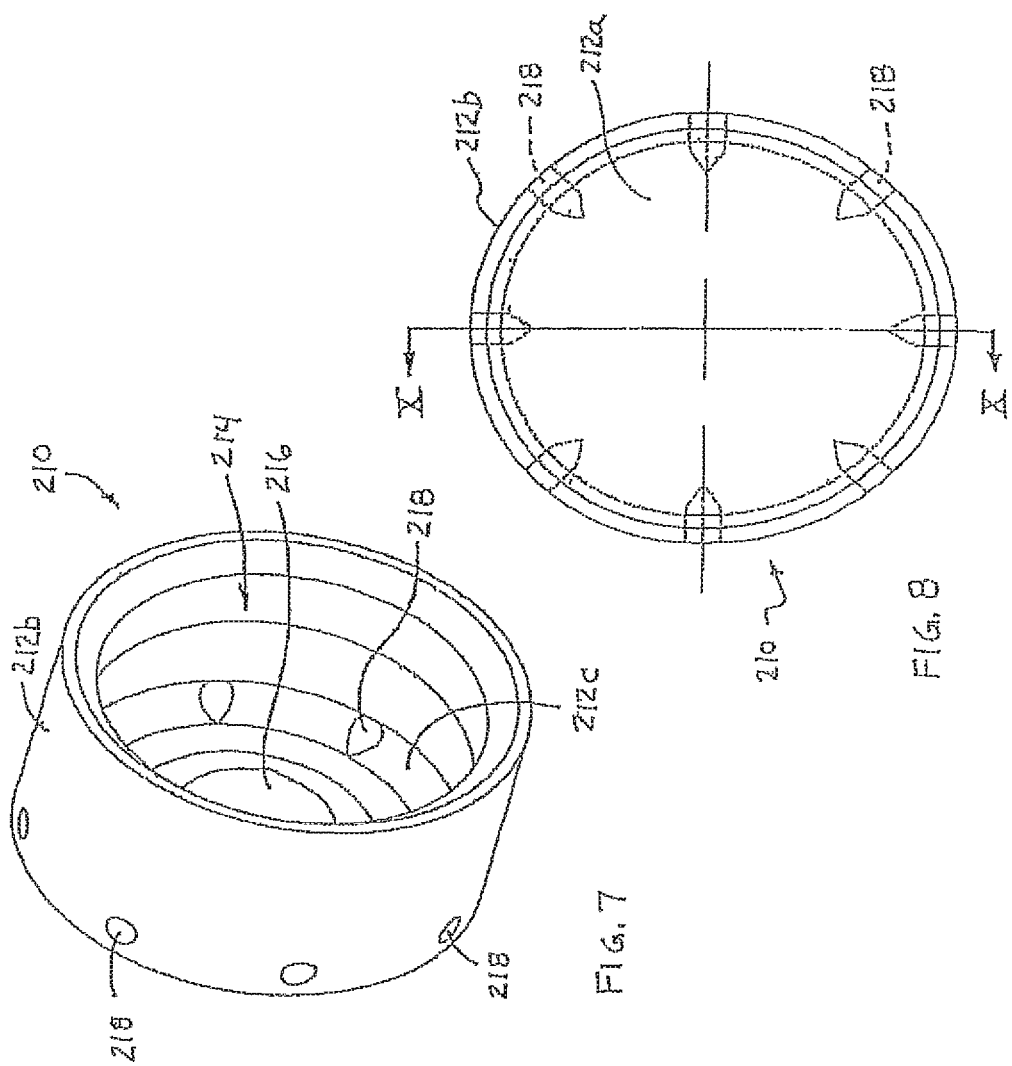

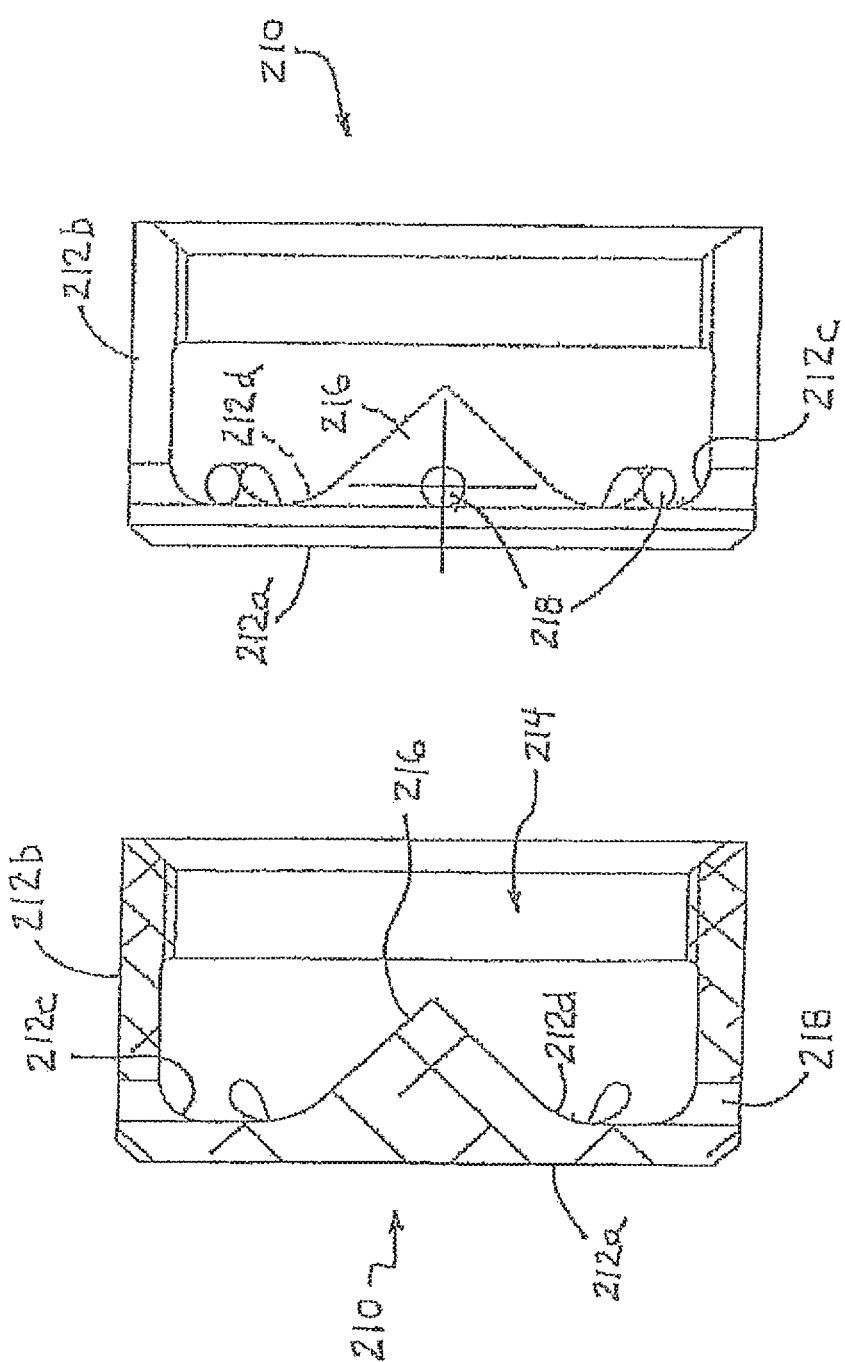

AUTO-RELEASE VACUUM DEVICE

CROSS REFERENCE TO RELATED APPLICATION

The present application claims the benefit of U.S. provisional application, Ser. No. 60/698,031, filed Jul. 11, 2005, which it hereby incorporated herein by reference in its entirety.

FIELD OF THE INVENTION

This application is a continuation of U.S. Ser. No. 15/829,058, filed Dec. 1, 2017, which is a continuation of Ser. No. 14/814,708, filed Jul. 31, 2015 (now U.S. Pat. No. 9,833,910), which is a continuation of U.S. Ser. No. 13/826,756, filed Mar. 14, 2013 (now U.S. Pat. No. 9,095,983), which is a continuation of U.S. Ser. No. 13/471,882, filed May 15, 2012 (now U.S. Pat. No. 8,479,781), which is a continuation of U.S. Ser. No. 13/116,037, filed May 26, 2011 (now U.S. Pat. No. 8,201,589), which is a continuation of U.S. Ser. No. 14/708,854, filed Feb. 19, 2010 (now U.S. Pat. No. 7,950,422), which is a continuation of U.S. Ser. No. 12/437,677, filed May 8, 2009 (now U.S. Pat. No. 7,681,603), which is a continuation of U.S. Ser. No. 11/430,712, filed May 9, 2006 (now U.S. Pat. No. 7,540,309), which claims the benefit of U.S. provisional application, Ser. No. 60/698,031, filed Jul. 11, 2005. The disclosures of the above applications are incorporated herein by reference.

BACKGROUND OF THE INVENTION

It is known to provide a material handling system that includes vacuum cups or the like that are adapted to be moved into engagement with an object, such as a substantially flat object or panel or the like, and to lift and move the object to a desired location. Such vacuum cups or suction cups may be moved into engagement with the object, and a vacuum source may be actuated to create a vacuum between the object and the cup such that the object is retained to the cup as it is transported to the targeted area. An example of such a vacuum cup is disclosed in U.S. Pat. No. 4,662,668, which is hereby incorporated herein by reference.

The vacuum generated at the cup may be provided by a venturi nozzle; whereby pressurized air is supplied or provided to a venturi nozzle at the cup and the air forced through the venturi nozzle creates a vacuum at the cup to seal the cup to the object surface. The venturi nozzle has an inlet port connected to the air supply and an exit port through which the air is blown. The internal cavity defined by the vacuum cup and object is in fluid communication with the venturi nozzle so that air is drawn out of the cavity as the air is blown through the venturi nozzle. When the air supply is deactivated, the vacuum within the cup cavity may dissipate through the port that connects the vacuum cup cavity to the venturi nozzle and through the exit port. Thus, there may be a delay between when the air supply is deactivated and when the vacuum dissipates a sufficient amount to readily release the vacuum cup from the object.

SUMMARY OF THE INVENTION

The present invention provides an automatic release vacuum device or venturi device, such as for a vacuum cup assembly of a material handling system that is operable to move one or more vacuum cups into engagement with an object and to pick up and move the object to a targeted or desired location. The material handling system may move the vacuum cup into engagement with the object, and may create a vacuum or partial vacuum at a cup cavity, such as via a vacuum source or an air supply or other pneumatic device or the like, to substantially seal the vacuum cup to the object. The vacuum device includes a venting element at a venting port to substantially vent the vacuum or partial vacuum at the vacuum cup to atmosphere when the vacuum source or pneumatic device is deactivated.

According to an aspect of the present invention, an automatic release vacuum device or venturi device for a material handling system includes a vacuum device body and a movable sealing element. The vacuum device body is adapted to connect to a pressurized air supply, and includes a vacuum passageway and a vacuum generating device, such as a venturi nozzle or device at or in fluid communication with the vacuum passageway. The pressurized air supply is activatable to supply pressurized air at the vacuum generating device to generate at least a partial vacuum in the vacuum passageway. The movable sealing element is movable between a sealing position, where the movable sealing element substantially seals the vacuum passageway, and a venting position, where the movable sealing element substantially vents the vacuum passageway. The vacuum device is configured to divert a portion of the pressurized air to the movable sealing element to urge the movable sealing element toward the sealing position when the pressurized air supply is activated. The movable sealing element is urged toward the venting position when the pressurized air supply is deactivated to substantially vent the vacuum passageway to atmosphere when the pressurized air supply is deactivated.

The vacuum device body includes a diverting passageway that diverts the portion of the pressurized air to a substantially enclosed cavity at the movable sealing element to urge the movable sealing element toward the sealing position. The automatic release vacuum device includes a biasing element that functions to urge the movable sealing element toward the venting position. The diverting passageway diverts the portion of the pressurized air to the movable sealing element to at least partially overcome a biasing force of the biasing element to urge the movable sealing element toward the sealing position when the pressurized air supply is activated.

In one form, the movable sealing element may comprise a flexible membrane element that flexes to engage and disengage a venting port of the vacuum device. In another form, the movable sealing element may comprise a piston element that moves along a passageway of the vacuum device body between the sealing and venting positions.

The automatic release vacuum device is suitable for and may be configured for use with a vacuum cup assembly of the material handling system, with a vacuum cup of the assembly being configured to engage an object and being movable to move the object when engaged therewith. The vacuum cup is configured to substantially seal against the object when the movable sealing element is at the sealing position and the vacuum generating device generates at least a partial vacuum in the vacuum passageway.

According to another aspect of the present invention, a vacuum cup assembly of a material handling system, with the vacuum cup assembly being engagable with an object and movable to move the object, includes a vacuum device, a vacuum cup and a noise reducing device. The vacuum device is adapted to connect to a pressurized air supply and has a vacuum passageway and a venturi nozzle positioned within the vacuum device. The vacuum cup is attached to the vacuum device and is configured to engage an object. The pressurized air supply is activatable to force pressurized air through the venturi nozzle to generate the at least partial vacuum in the vacuum passageway and at the vacuum cup when the vacuum cup is engaged with an object. The pressurized air flows through the venturi nozzle and draws air from the vacuum passageway and into the venturi nozzle via at least one vacuum port of the venturi nozzle. The noise reducing device is located at a discharge of the venturi nozzle and comprises a housing defining a chamber with a conical-shaped diverter element. The housing has a plurality of radially spaced exit openings, whereby air discharged at the venturi nozzle is diverted by the conical-shaped diverter element and flows out through the exit openings of the housing. The vacuum cup is configured to substantially seal against the object when the venturi device generates at least a partial vacuum in the vacuum passageway.

The housing of the noise reducing device may include an outer end and a sidewall that cooperate to define the chamber. The conical-shaped diverter element protrudes from the outer end and toward the venturi nozzle. The sidewall may function to attach the noise reducing device to the vacuum device. The housing of the noise reducing device includes a curved transition region between the conical-shaped diverter element and the outer end. The housing includes a curved transition region between the outer end and the sidewall. The exit openings are formed through the sidewall and generally at the outer end of the housing.

According to yet another aspect of the present invention, a vacuum cup assembly for a material handling system includes a vacuum cup, a vacuum device and a sealing device or element. The vacuum cup assembly is engagable with an object and movable to move the object. The vacuum cup has a perimeter seal for engaging and substantially sealing at an object surface. The vacuum device is attached to the vacuum cup and is configured to draw air out of a cavity defined by the perimeter seal and the object surface when the vacuum cup is engaged with the object surface. The vacuum device comprises a unitary body and houses a venturi nozzle and defines a vacuum passageway that is in fluid communication with a vacuum port of the vented nozzle. An inlet of the venturi nozzle is connectable to a pressurized air supply, which is activatable to force air through the venturi nozzle to generate at least a partial vacuum in the vacuum passageway. The vacuum passageway extends through the body and between the vacuum cup and a venting passageway or port of the body. The body defines a diverting passageway that diverts air from the inlet of the venturi nozzle to the sealing element. The diverting passageway diverts air to the sealing element to urge the sealing element toward engagement with the venting part or otherwise toward a sealing position that substantially seals or closes the venting port or passageway. The sealing element is thus movable to substantially dose or seal the vacuum passageway when the pressurized air supply is activated and when air flows through the diverting port to the sealing element. The sealing element is movable to disengage from or open the venting port or passageway to substantially vent the vacuum passageway to atmosphere when the vacuum source is deactivated.

Therefore, the present invention provides an automatic release vacuum device or venturi device, such as for a vacuum cup assembly of a material handling system that moves the vacuum cup assembly into engagement with an object. A vacuum or partial vacuum generated by the vacuum device may be readily applied to the vacuum cup of the vacuum cup assembly to substantially seal the vacuum cup to the object. When the vacuum source or pressurized air supply or other pneumatic device is reduced or deactivated, the vacuum or partial vacuum within the vacuum cup is readily and rapidly vented to atmosphere via a sealing/venting element of the vacuum device. The sealing/venting element functions to substantially seal or close the vacuum passageway when the vacuum source is activated, and is readily and automatically disengaged or moved to open or vent the vacuum passageway when the vacuum source is deactivated. The sealing/venting element (such as a membrane or piston or the like) of the vacuum device may be engaged against the vacuum device body or other sealing element in response to the vacuum generated within the vacuum device body and in response to pressurized air provided at the sealing/venting element, such that the pressure differential at the sealing/venting element causes the sealing/venting element to substantially seal or dose the vacuum passageway. When the vacuum is deactivated, the sealing/venting element may be disengaged from the venting port or other sealing element or may otherwise open or vent the vacuum passageway, such as in response to a biasing element or spring, as the vacuum is at least partially reduced and/or as the pressurized air from the diverting passageway is reduced or eliminated. The vacuum at the vacuum cup assembly thus may be automatically and readily vented to atmosphere to release the vacuum cup from the object at the desired or targeted destination or location. The vacuum passageway, diverting passageway and sealing/venting element are positioned or formed within the body of the vacuum device so as to provide an integral vacuum device or auto-release venturi device for the vacuum cup assembly.

These and other objects, advantages, purposes and features of the present invention will become apparent upon review of the following specification in conjunction with the drawings.

BRIEF DESCRIPTION OF THE DRAWINGS

FIG. 7 is a perspective view of a venturi silencer useful with a venturi vacuum device;

FIG. 8 is an end elevation of the venturi silencer of FIG. 7;

FIG. 9 is a side elevation of the venturi silencer of FIGS. 7 and 8; and FIG. 10 is a sectional view of the venturi silencer taken along the line X-X in FIG. 8.

DESCRIPTION OF THE PREFERRED EMBODIMENTS

Figure 1:
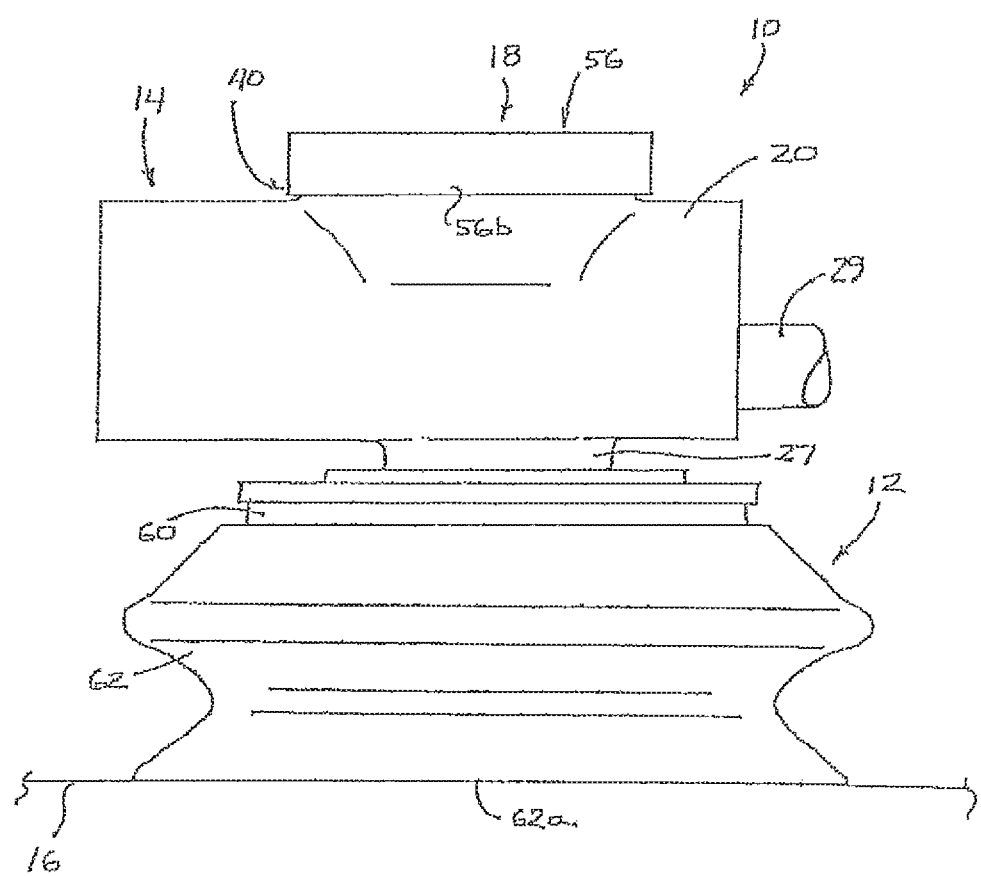
FIG. 1 is a side elevation of a vacuum cup assembly with a vacuum device in accordance with the present invention.

Referring now to the drawings and the illustrative embodiments depicted therein, a vacuum cup assembly 10 includes a vacuum cup 12 and an integral automatic release vacuum assembly or venturi assembly or vacuum device 14 operable to create a vacuum or partial vacuum within the vacuum cup 12 when the vacuum cup is engaged with a surface of an object 16 (FIG. 1). The vacuum cup assembly 10 is mountable to t support assembly of a material handling system, which is operable to move the support and vacuum cup assembly (or multiple vacuum cup assemblies or suction cups) into engagement with an object, where the vacuum cup may engage and seal to the object for picking up and moving the object. The material handling system includes a vacuum source or pressurized air supply or pneumatic device for providing or creating a vacuum or partial vacuum at the vacuum cup assembly 10 to substantially vacuum seal the vacuum cup 12 to the object 16. The vacuum device 14 includes a sealing and venting device or assembly or element 18 that is openable to atmosphere in response to deactivation of the vacuum source or air supply or pneumatic device to substantially vent the vacuum from the vacuum cup when the vacuum source or air supply or pneumatic device is deactivated, as discussed below. In the illustrated embodiment, the vacuum source comprises a venturi device or nozzle that is connected to or in fluid communication with a pressurized air supply, such that when the pressurized air supply is activated, pressurized air flows through the venturi device to generate a vacuum in the vacuum device and vacuum cup, as also discussed below.

Figure 2:
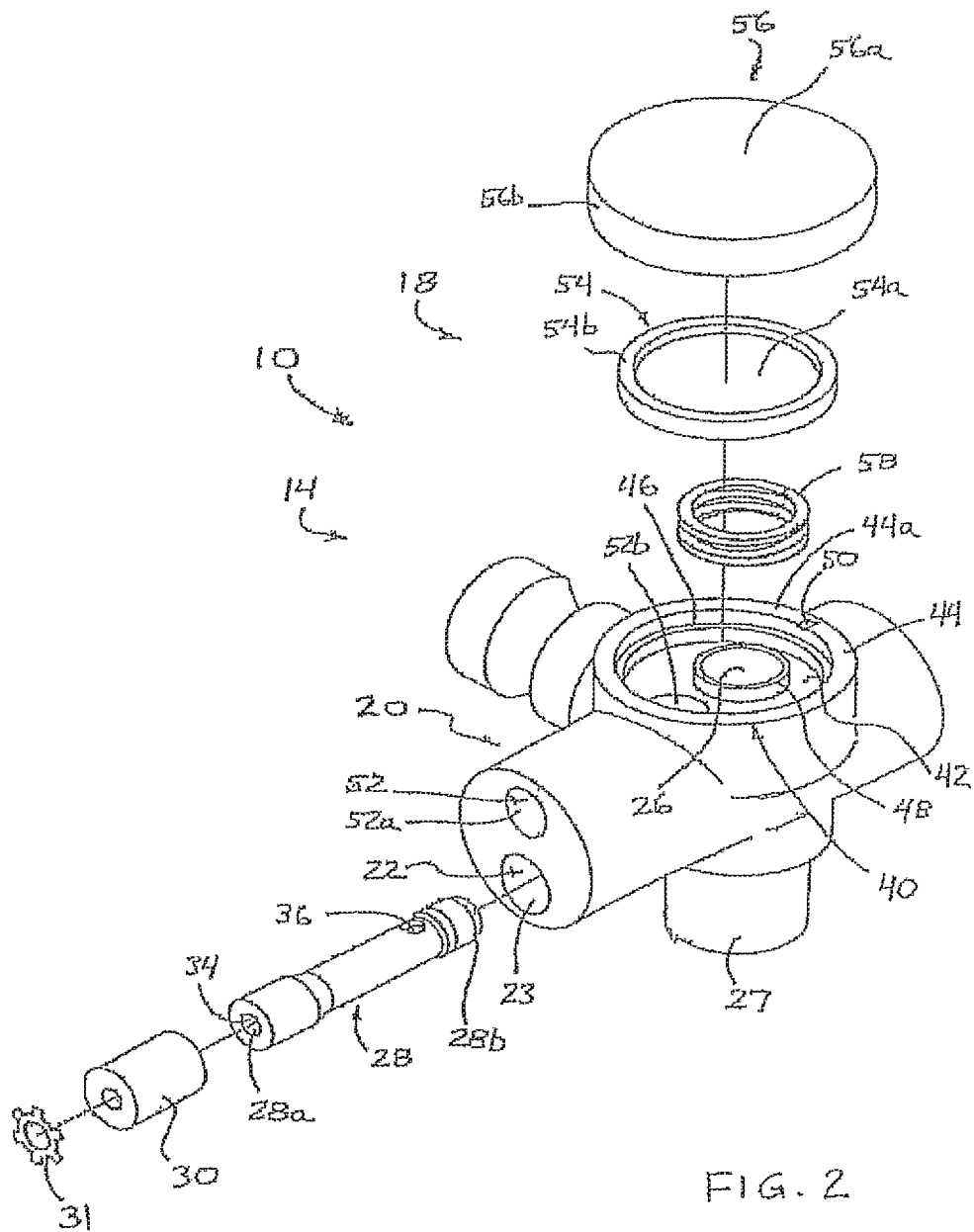
FIG. 2 is an exploded perspective view of a vacuum device in accordance with the present invention.
Figure 3:
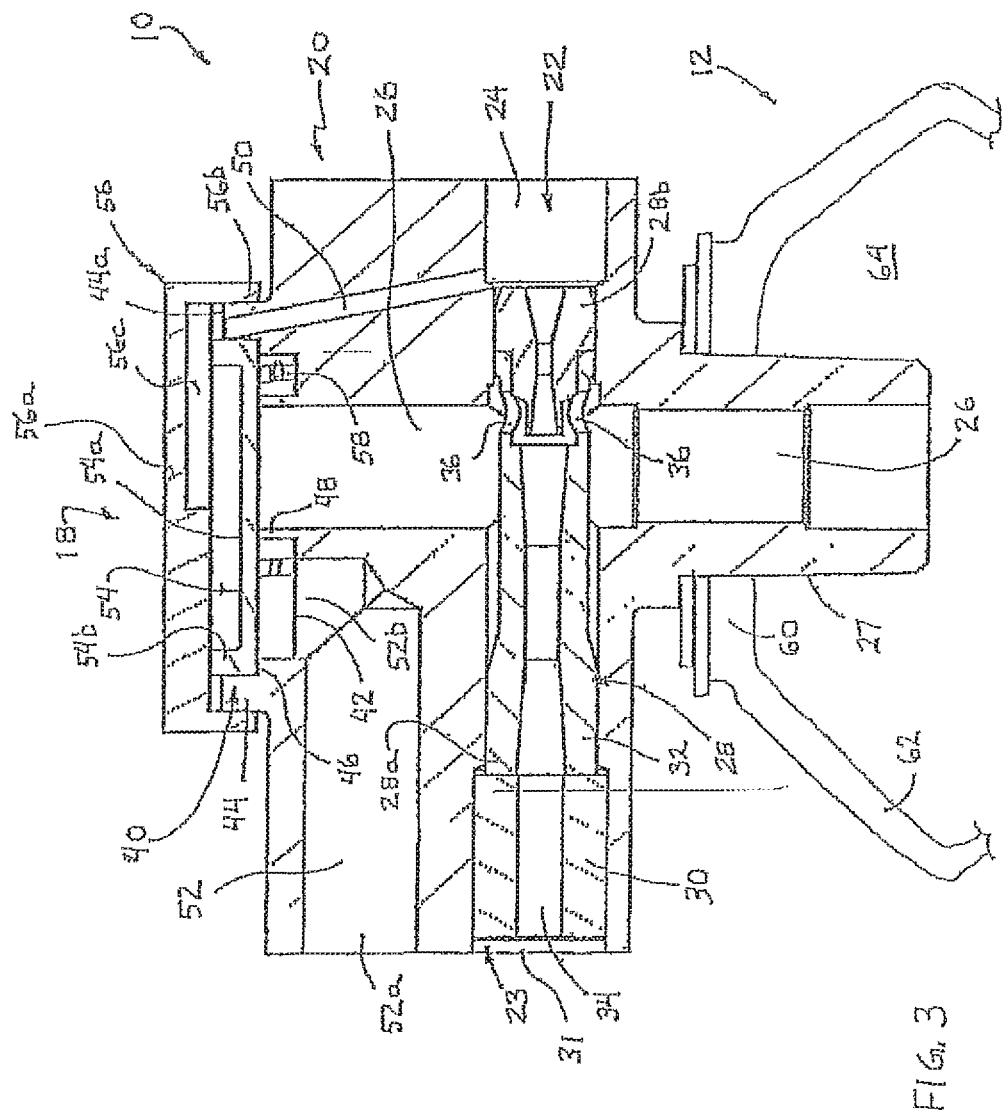
FIG. 3 is a sectional view of the vacuum device of the present invention.

As shown in FIGS. 2 and 3, vacuum device 14 includes a vacuum device body or body portion 20 that is preferably unitarily formed and that includes or defines vacuum and venting passageways and ports as described below. For example, the body 20 may be cast or molded or otherwise formed of a metallic material, such as aluminum or the like, or a polymeric material, such as engineering plastic or the like, and may have the passageways bored or drilled through the unitary body to define and connect the appropriate passageways, as discussed below. The vacuum device 14 may be connected to a support arm (not shown) or the like of the material handling device, and may be connected to any type of support arm, without affecting the scope of the present invention. The vacuum cup assembly and material handling system of the present invention may utilize aspects described in U.S. patent application Ser. No. 11/034,046, filed Jan. 12, 2005 by Attee et al. for VACUUM CUP; and/or Ser. No. 10/931,637, filed Sep. 1, 2004 by Kniss for ADJUSTABLE MOUNT FOR VACUUM CUP, which are hereby incorporated herein by reference.

As shown in FIG. 3, body 20 includes or defines a vacuum generating passageway 22 therethrough. Vacuum generating passageway 22 defines an outlet or exit port 23 and an inlet or entry port 24 at opposite ends of the passageway 22 and body 20. A vacuum generating device 28 is positioned at or in or partially in vacuum generating passageway 22 and is connectable to a vacuum source or air supply tube or pipe 29 (FIG. 1) at inlet port 24. In the illustrated embodiment, vacuum generating device 28 comprises a venturi nozzle that is positioned along passageway 22 with an outlet end 28a at outlet port 23 and an inlet or entry end 28b at or near inlet port 24. A vacuum passageway 26 connects to and is in fluid communication with vacuum generating passageway 22 and vacuum cup 12 at one end and sealing and venting device 18 at the other end, as discussed below. Vacuum passageway 26 terminates at a vacuum cup connection port 27 for connecting body 20 to vacuum cup 12.

Venturi nozzle 28 includes a nozzle body or body portion 32 and a passageway 34 extending longitudinally along the nozzle body 32. The nozzle body 32 includes at least one vacuum port 36 to provide fluid communication through nozzle body 32 to passageway 34. When venturi nozzle 28 is positioned within passageway 22 of body 20, vacuum port or ports 36 is/are positioned generally at and in fluid communication with vacuum passageway 26 of body 20. As is known in the vacuum cup and venturi nozzle art, the passageway 34 of venturi nozzle 28 comprises a narrowing and widening passageway to increase the air flow rate through the venturi nozzle 28 when the air supply or source is activated, whereby air flow through the venturi nozzle 28 draws air through vacuum ports 36 and from vacuum passageway 26 to create a vacuum or partial vacuum in the vacuum passageway 26 when the vacuum passageway is not vented, as discussed below. A silencing element or diffusing element 30 and retaining ring 31 may be positioned at outlet end 28a of nozzle 28.

In the illustrated embodiment of FIGS. 2 and 3, vacuum passageway 26 of body 20 extends upwardly or outwardly from passageway 22 and vented nozzle 28, with sealing and venting device 18 positioned at an outer end of passageway 26 and at an upper end or outer or venting portion 40 of body 20. Sealing and venting device 18 functions to selectively substantially close and seal vacuum passageway 26 when the air supply is activated and to open or vent vacuum passageway 26 to release or vent the vacuum within the vacuum cup when the vacuum source or air supply is deactivated, as discussed in detail below. As can be seen with reference to FIGS. 2 and 3, venting portion 40 of body 20 includes a recessed or venting surface 42 within an outer raised ring or cylindrical extension or ring or wall 44 that substantially surrounds venting surface 42. The outer ring 44 includes a stepped or intermediate surface 46 that is within outer ring 44 and spaced from venting surface 42. An inner raised ring or cylindrical extension or venting port 48 extends or protrudes outwardly from venting surface 42 and defines an outer end of the vacuum passageway 26.

Body 20 of vacuum device 14 also includes or defines a diverting port or passageway 50 that connects and provides fluid communication between the inlet port 24 of the nozzle passageway 22 to an upper or outer surface or end 44a of the outer ring 44 at venting portion 40 of body 20. Body 20 also includes or defines a venting passageway or port 52 that is open to atmosphere at one end 52a and that is open at its other end 52b at venting surface 42 of venting portion 40 of body 20. The sealing and venting device or assembly 18 functions to selectively connect or provide fluid communication between venting port 52 and vacuum passageway 26 to vent the vacuum cup to atmosphere when the vacuum source or air supply is deactivated, as discussed below.

As best shown in FIGS. 2 and 3, sealing and venting device 18 includes a first sealing element 54, such as a sealing cap or diaphragm, and an outer cap or cover 56. In the illustrated embodiment of FIGS. 2 and 3, the sealing element 54 comprises a flexible membrane element or diaphragm. However, the sealing element may comprise other movable means for engaging another sealing element to seal the passageway when the pressurized air supply is activated and to disengage from the other sealing element to vent the passageway when the pressurized air supply is deactivated, such as a movable piston sealing element, as discussed below with respect to FIGS. 4-6, or other movable element while remaining within the spirit and scope of the present invention. Diaphragm 54 comprises a generally flat disc or flexible or movable sealing element or diaphragm element 54a and a generally cylindrical wall 54b surrounding diaphragm element 54a and extending upwardly therefrom when diaphragm 54 is positioned at venting portion 40 of body 20 as shown in FIG. 3. Diaphragm element 54a is a thin flexible membrane that may flex toward and away from the venting port or inner extension or second sealing element 48 during operation of the vacuum cup assembly, as discussed below. In the illustrated embodiment of FIGS. 2 and 3, cylindrical wall 54*b* of diaphragm 54 is attached to or positioned at the lip or step or ledge 46 of outer wall or ring 44 of body 20.

Cover 56 comprises a generally flat disc portion 56*a* and a generally cylindrical wall pardon 56*b* surrounding disc portion 56*a* and extending downwardly therefrom when cover 56 is positioned at venting portion 40 of body 20 as shown in FIG. 3. Disc portion 56*a* of cover 56 may include a recessed portion or recess 56*c* at its inner surface. In the illustrated embodiment, wall portion 56*b* of cover 56 is attached to or positioned at and around the outer wall or ring 44 to substantially encase the outer end of the outer wall or ring 44 and diaphragm 54 within the cover 56 and between cover 56 and body 20. Cover 56 may be secured to diaphragm 54 so that the diaphragm and cover assembly are mounted to body 20 together, or cover 56 and diaphragm 54 may comprise separate components that are mounted separately to the respective portions of body 20, without affecting the scope of the present invention.

As shown in FIG. 3, disc portion 56*a* of cover 56 may rest on or engage the outer ends of cylindrical wall 54*b* of diaphragm 54, while cylindrical wall 56*b* of cover overlaps or encompasses or receives outer cylindrical wall or extension 44 of upper or outer body portion 40. When cover 56 is positioned over diaphragm 54, the recess 56*c* provides a passageway for fluid communication or air flow between the diverting passageway 50 at the outer end 44*a* of the outer cylindrical extension 44 and the area between the cap or cover 56 and the diaphragm element 54*a*. When the movable sealing element or diaphragm element 54*a* is disengaged from the second sealing element or venting port 48, vacuum passageway 26 is vented to atmosphere via venting passageway 52 to vent the vacuum cup 12 to atmosphere to release the vacuum cup from the object, as discussed below.

Sealing and venting device 18 further includes a biasing element or member or spring 58, which is positioned generally around venting port 48 of body portion 40 and between venting surface 42 and diaphragm element 54*a*. Biasing element 58 functions to bias or urge the first or movable sealing element or diaphragm element 54*a* away from engagement with second sealing element or venting port 48, such that air may flow between vacuum passageway 26 and venting passageway 52 when diaphragm element 54*a* is disengaged from venting port 48, as discussed below.

As shown in FIGS. 1 and 3, vacuum cup 12 of vacuum cup assembly 10 is attached to vacuum cup connection port 27 of body 20 and is, in the illustrated embodiment, positioned generally opposite from sealing and venting device 18 and venting portion 40. Vacuum cup 12 includes a body portion 60 and a perimeter seal portion 62. Vacuum cup 12 includes an opening for receiving vacuum cup connection port 27 of body 20. When vacuum cup 12 receives vacuum port 27, vacuum passageway 26 provides fluid communication between venturi nozzle 28 and a cavity 64 defined by the body portion 60 and perimeter seal 62 of vacuum cup 12 and the surface of the object 16 that is engaged with an engaging end 62*a* of the perimeter seal 62. Vacuum cup 12 may be integrally or unitarily molded from an elastomeric material or may be otherwise formed or molded, without affecting the scope of the present invention. Although shown as a vacuum cup having a bellows style or accordion style perimeter seal, it is envisioned that the vacuum cup may have other seal portions (such as a tapered perimeter seal portion or the like, and/or such as a seal portion of the types described in U.S. patent application Ser. No. 11/034,046, filed Jan. 12, 2005 by Attee et al. for VACUUM CUP, which is hereby incorporated herein by reference), and/or other types of vacuum cups may be implemented with the material handling device, without affecting the scope of the present invention.

Vacuum cup 12 may be attached to or adhered to or molded to or fastened to or otherwise secured to vacuum port 27 of body 20 of vacuum device 14. In the illustrated embodiment, vacuum port 27 is received in or positioned at or at least partially through the opening at the body portion 60 of vacuum cup 12. Vacuum passageway 26 allows air to flow from cavity 64 and through vacuum passageway 26 to draw air out of cavity 64 to create a vacuum or partial vacuum within cavity 64 when the air supply is activated.

During operation of vacuum cup assembly 10, pressurized air is supplied at inlet port 24 (such as via a hose or tube 29 or the like) and flows through venturi nozzle 28 and out exit port 23 of body 20. As the air flows through venturi nozzle 28, air is drawn through vacuum ports 36 from vacuum passageway 26 and into passageway 34 of nozzle 28 and out the exit port 23. When the pressurized air flows through the venturi nozzle 28, a portion of the pressurized air that enters the nozzle at inlet port 24 is diverted through diverting passageway 50 and into recess or cavity 56*c* between cover 56 and first sealing element or diaphragm 54 to pressurize the cover and diaphragm assembly, and thereby functions to exert a downward pressure against movable or flexible diaphragm element 54*a* to urge the diaphragm element 54*a* downward and against the urging of biasing element 58 and into sealing engagement with second sealing element or venting port 48 of venting portion 40 to substantially seal diaphragm element 54*a* against venting port 48. Also, as the air is drawn from vacuum passageway 26 by the venturi nozzle, the diaphragm element 54*a* or first sealing element is pulled downward against biasing element 58 and toward engagement with the outer end of second sealing element or venting port 48 to substantially seal or close vacuum passageway 26. The diverting passageway 50 and cover 56 thus provide pressurized air above diaphragm 54 or at the opposite side of diaphragm 54 from the vacuum passageway 26, in order to assist in moving or urging diaphragm element 54*a* to a sealing position and against venting port 48 at venting portion 40 of body 20 when the vacuum source or air supply is activated. Because pressurized air is provided above or outside of diaphragm 54 while a partial vacuum is provided below or at the inner side of diaphragm 54, the increased pressure differential at the diaphragm element causes the diaphragm element 54*a* to flex into engagement with the venting port to substantially close or seal the vacuum passageway at the venting port. Also, as air is drawn through vacuum port 36 of nozzle 28 from vacuum passageway 26, a vacuum or partial vacuum is created within the cavity 64 defined by the vacuum cup 12 and the object surface to which the vacuum cup is engaged.

When the air supply or vacuum source is substantially reduced or deactivated, pressurized air is no longer forced or blown to and through the venturi nozzle and thus does not flow through diverting passageway 50 to urge diaphragm element 54*a* downward or toward the second sealing element. The vacuum or partial vacuum within vacuum passageways 26 and cavity 64 thus may dissipate via venting through ports 36 and exit port 28*a* of venturi nozzle 28. When the diverted pressurized air is no longer present at the first sealing element, the biasing element or member or spring may urge the first sealing element away from the second sealing element and to a venting position so that the vacuum passageway is vented to atmosphere. Thus, when the pressurized air supply is deactivated or reduced, biasing element 58 urges diaphragm element 54a outward and away from venting port 48 so that vacuum passageway 26 is vented to atmosphere via air flow through venting passageway 52 and around the venting port 48 and into vacuum passageway 26. The vacuum passageway 26 is formed within body at a sufficient diameter to provide clearance around the venturi nozzle 28 so that the vacuum within cavity 64 of vacuum cup 12 is quickly vented to atmosphere via air flow through the venting passageway 52 and vacuum passageway 26. The vacuum or partial vacuum within the vacuum cup thus is quickly released or vented after the vacuum source or air supply is deactivated, and does not have the delay in venting that typically occur as the vacuum or partial vacuum slowly dissipates through the ports of the venturi nozzle of known vacuum cups. The vacuum cup assembly of the present invention thus may be readily removed from the object when the air supply is deactivated.

Although shown and described as being a movable or flexible diaphragm element, the first or movable sealing element of the vacuum cup assembly may comprise other sealing means or devices or members or elements, without affecting the scope of the present invention. For example, and with reference to FIGS. 4-6, a sealing and venting device or assembly or element 118 of a vacuum device 114 of a vacuum cup assembly 110 may comprise a first sealing element or movable sealing element 154, such as a piston element, that is movable along a venting passageway or upper or outer passageway portion 126a at or in fluid communication with the vacuum passageway 126 of the body 120 of vacuum device 114 of the vacuum cup assembly 110 to selectively seal and vent the vacuum device and vacuum cup assembly. For example, piston element 154 may engage a second sealing element or portion or seal or ring 155 (such as an elastomeric or rubber sealing ring or the like) positioned at the passageway portion 126a and at or outward from an upper end of the vacuum passageway 126, in order to substantially seal the passageway 126a so that vacuum is generated in the passageway 126 by the venturi device 128. The piston element 154 may move along the passageway portion 126a to engage the sealing ring 155 to substantially seal or close the vacuum passageway (as shown in FIG. 5) when the pressurized air supply is activated to generate the vacuum, and may move away from the sealing ring 155 to vent the vacuum passageway to atmosphere (as shown in FIG. 6) when the pressurized air supply is deactivated or reduced.

The rigid or substantially rigid and movable piston element may provide a robust sealing element and may substantially seal the vacuum passageway when engaged with the sealing ring. The vacuum device 114 and vacuum cup assembly 110 may be otherwise substantially similar to the vacuum device 14 and vacuum cup assembly 10 discussed above, such that a detailed discussion of the vacuum devices and vacuum cup assemblies will not be repeated herein. The similar or common components or elements of the vacuum devices and vacuum cup assemblies are shown in FIGS. 4-6 (except the vacuum cup is not shown in FIGS. 4-6) with the same reference numbers as used in FIGS. 1-3, but with 100 added to each of the reference numbers.

Figure 4:
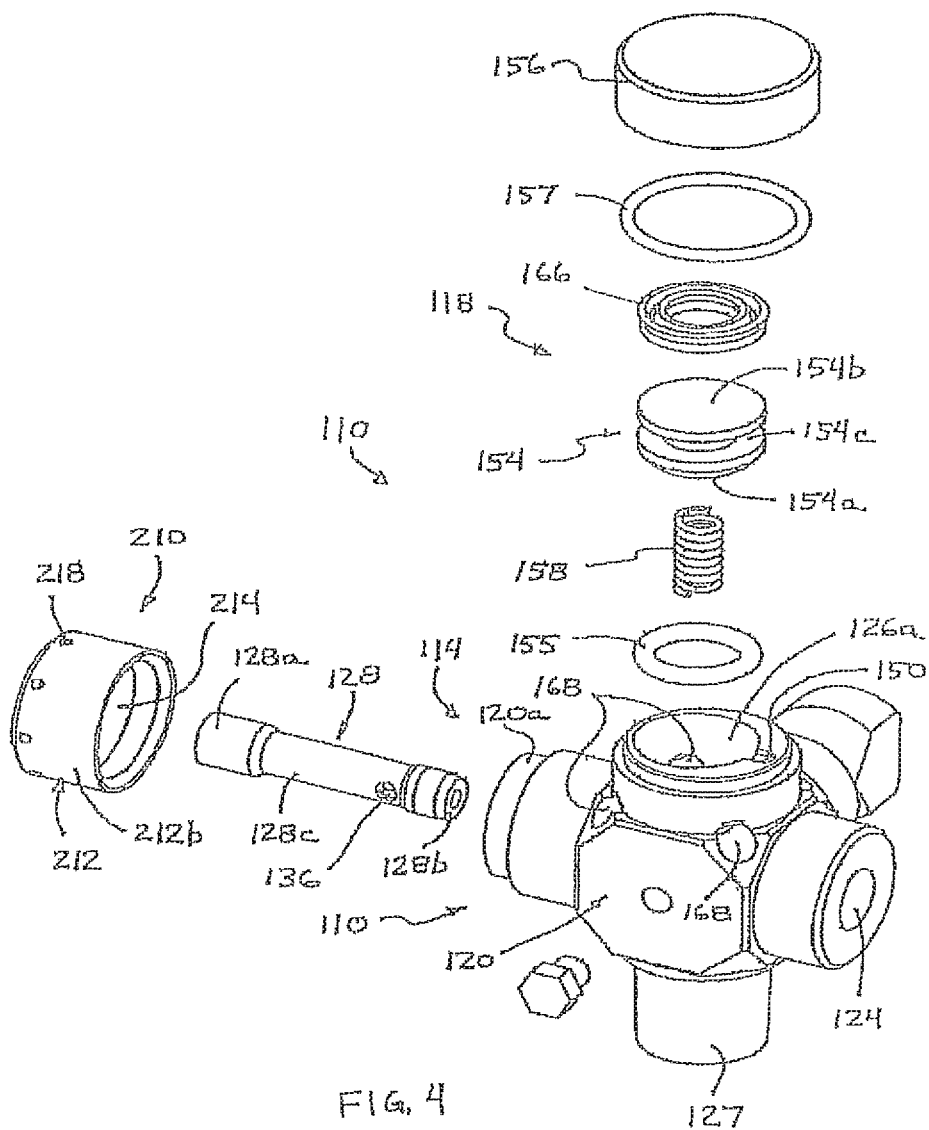
FIG. 4 is an exploded perspective view of another vacuum device in accordance with the present invention, with a piston that is movable to seal or vent the vacuum passageway.
Figure 5:
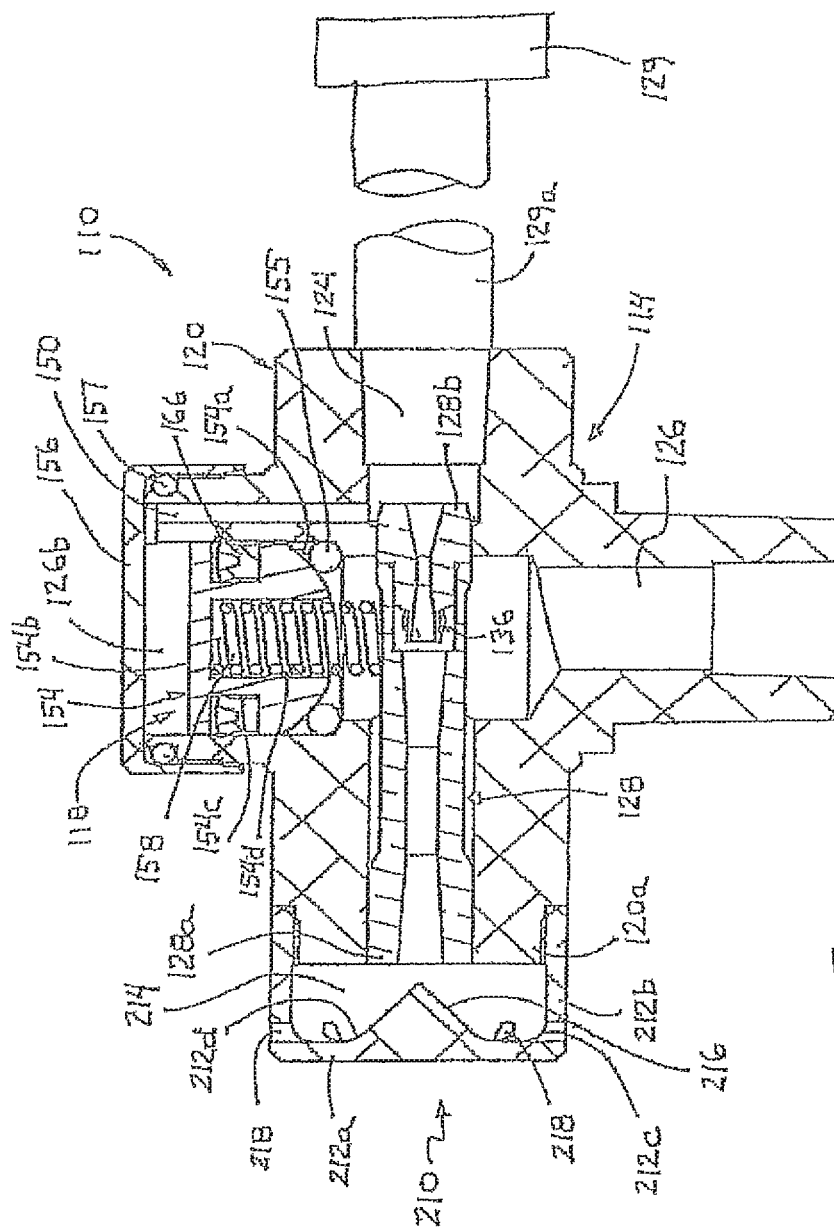
FIG. 5 is a sectional view of the vacuum device of FIG. 4, shown with the piston in a sealing orientation.
Figure 6:
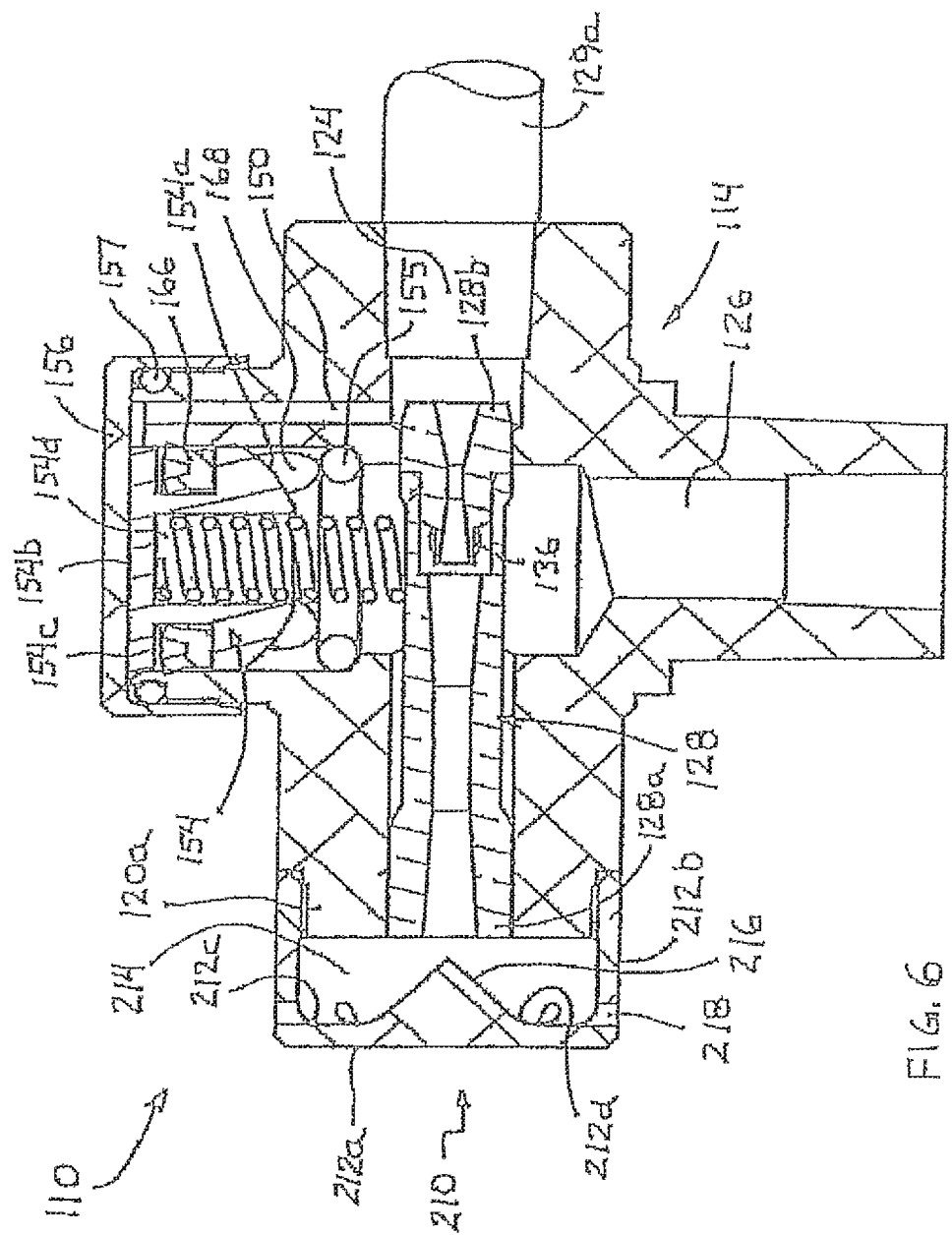
FIG. 6 is another sectional view of the vacuum device of FIG. 4, shown with the piston in a venting orientation.

In the illustrated embodiment of FIGS. 4-6, piston element 154 comprises a generally cylindrically shaped element that is movable along a generally cylindrical-shaped passageway portion 126a at or near vacuum passageway 126 (although other cross sectional shapes may be implemented without affecting the scope of the present invention). A lower or engaging end 154a of piston element 154 may be rounded or curved so as to be partially received in and substantially uniformly engage sealing ring 155 when piston element 154 is urged against the sealing ring 155 (as shown in FIG. 5) when the air supply is activated to generate the vacuum or partial vacuum in the vacuum passageway. More particularly, when the air supply is activated (such as a pressurized air supply or pneumatic device 129 that supplies pressurized air to the vacuum device, such as via an air hose or line 129a), the diverting passageway 150 (formed through the body 120 between an inlet port 124 and an upper or outer end of the venting passageway or passageway portion 126a) diverts some of the pressurized input air to the upper or outer area or cavity 126b (FIG. 5) of passageway portion 126a (between an outer end 154b of piston element 154 and a cap or cover 156 of vacuum cup assembly 110) and thus at the upper or outer end 154b of piston element 154 (and at the opposite side of the piston element from the sealing ring and venting port). The diverted portion of the pressurized input air thus provides a downward pressure against the piston element to assist in urging the piston element toward engagement with sealing ring 155. Thus, when moved to a sealing position, the piston element 154 may substantially seal against the sealing ring 155 to substantially seal and separate or isolate the vacuum passageway from atmosphere. The cap or cover 156 is secured to body 120, and preferably substantially sealed to the body 120, at the outer end of venting passageway 126a, such as via a sealing element 157, such as an O-ring or the like.

Piston element 154 also desirably includes a sliding seal or ring 166 circumferentially around the piston element to seal the piston element within the passageway portion 126a and to enhance sliding or movement of the piston element 154 along the passageway portion. As can be seen in FIGS. 4-6, sliding seal 166 is received in a groove 154c formed circumferentially around piston element 154 and between the curved sealing surface 154a and the outer end 154b of piston element 154. Sliding seal 166 limits air leakage past piston element 154 within passageway 126a, while allowing substantially unrestricted and smooth movement of piston element within the passageway.

Vacuum cup assembly 110 includes a biasing element or urging element or spring 158 that functions to bias or urge piston element 154 outward and away from sealing ring 155 and toward a venting position. In the illustrated embodiment, biasing element or spring 158 is partially received within a passageway or recess 154d formed longitudinally partially along piston element 154 and protrudes therefrom to engage the venturi nozzle body 128c or to engage a stop element or plate portion (not shown) at or near the lower or inner end of the passageway portion 126a and/or upper or outer end of the vacuum passageway 126. Similar to the vacuum cup assembly 10 described above, the biasing force of the biasing element or spring 158 of vacuum cup assembly 110 may be overcome (and the spring or biasing element thus may be compressed) by the force exerted by the diverted portion of the pressurized inlet air at the upper or outer end 154b of piston element 154, and/or by the force exerted by the vacuum or partial vacuum generated within the vacuum passageway.

When the vacuum source or pressurized air supply is reduced or deactivated (and the diverted air is reduced or eliminated so that it no longer exerts sufficient pressure or force at the outer end 154b of piston element 154 to overcome the spring force or biasing force), the biasing force may overcome the vacuum pressure within the vacuum passageway and may move the piston element outward to disengage the piston element from the sealing ring. When the piston element is moved away from the sealing ring so that the curved engaging surface 154a is remote or spaced from sealing ring 155, the vacuum passageway is vented (and thus the vacuum or partial vacuum within the vacuum passageway and vacuum cup is vented and thus dissipated).

As can be seen in FIGS. 4 and 6, the body 120 may include passageways or channels or apertures or ports 168 that provide fluid communication or air flow between passageway 126a and the air or atmosphere surrounding the vacuum cup assembly. The passageways 168 are located above or outward from the sealing ring 155, and at the opposite side of sealing ring from the venturi device, such that air does not flow through the passageways 168 to vent the vacuum passageway 126a when piston element 154 is substantially sealed against sealing ring 155. Thus, when the piston element 154 is moved away from or disengaged from sealing ring 155, the vacuum passageway is readily vented to atmosphere, such as via air flow through and along channels or grooves or passageways 168 formed or established along the piston passageway portion 126a and outside of or above the sealing ring 155. The piston element 154 and sealing ring 155 thus function to substantially seal the vacuum passageway when the air supply is activated so that the vented device may generate a vacuum or partial vacuum within the vacuum passageway (when the vacuum cup is engaged with an object), and the piston element may move away from the sealing ring to vent the vacuum passageway when the air supply is deactivated or reduced (to assist in releasing the vacuum cup from the object).

Although shown and described as having a movable sealing element, such as a piston element or a diaphragm element, that engages a second sealing element, such as a sealing ring or a venting port, that is located remote from the venturi nozzle along the vacuum and venting passageways, it is envisioned that the movable sealing element may be located elsewhere in or at the vacuum device or body where the sealing device selective seals and vents the vacuum passageway in response to the pressurized air supply being activated and deactivated. For example, the movable sealing element may be movably or flexibly located at or generally around the vacuum port 136 of the venturi device 128. The second sealing device thus may comprise the venturi nozzle body itself and/or the portion of the body at or adjacent to the venturi nozzle body, and the movable sealing element may seal against the venturi device and/or body portion to seat the venting passageway when the pressurized air supply is activated, and may disengage from the venturi device to vent the vacuum passageway when the pressurized air supply is deactivated. Optionally, the movable sealing element, such as a piston element, may include a flexible or compressible or conformable seat (such as an elastomeric or rubber seal) at an engaging surface, and the piston element may move to engage the flexible seal with a sealing surface along the passageway, such as at an end of the vacuum passageway or at the venturi nozzle or elsewhere within the vacuum device, without affecting the scope of the present invention. Other configurations of a movable sealing element and the diverted air supply and biasing element (preferably all of which are within or integral with the body of the vacuum device) may be implemented while remaining within the spirit and scope of the present invention.

The movable sealing element thus functions to selectively seal and vent the vacuum passageway of the body. The venting port or ports may be located anywhere along the venting passageway so as to be exposed or in fluid communication with the vacuum passageway when the sealing element is in the venting position. It is envisioned that, if the movable sealing element is not substantially sealed against the walls of the venting passageway as it moves therealong (such as if a movable piston element includes longitudinal passageways along its outer circumferential region), the venting port may be located further along the venting passageway, and may be located at the cap or cover, without affecting the scope of the present invention. Thus, the venting port or ports may be located at various locations, as long as the venting passageway and venting ports are selectively sealed or isolated from the vacuum passageway by the sealing element when the sealing element is moved to the sealing position, and are selectively opened or in fluid communication with the vacuum passageway when the sealing element is moved to the venting position.

Optionally, and as shown in FIGS. 4-10, the vacuum cup assembly may include a venturi silencer device or noise reducing device 210, which may be located at a discharge end 128a of venturi device or nozzle 128 to reduce the noise generated by the venturi device during operation of the air supply and vacuum cup assembly. The silencer 210 includes a casing or housing 212 that is mounted or attached to the body 120 of the vacuum device and that defines a cavity or chamber 214 at the discharge end of the venturi device. The housing includes a conical shaped air diverter 216 protruding from an outer end portion 212a of housing 212 and generally toward the discharge end of the venturi device, and includes a plurality of outlet holes or discharge holes 218 radially spaced around the housing 212.

As best shown in FIGS. 9 and 10, the housing 212 has an outer end portion 212a and a cylindrical wall or portion 212b. Cylindrical wall or portion 212b cooperates with the outer end portion 212a of housing 212 to define the cavity 214 through which air flows from the discharge end of the venturi device and out through the holes 218. The conical diverter 216 protrudes from the end portion 212a and toward the discharge end of the venturi device when the silencer is attached to the body 120. The housing 212 preferably has generally smooth transition curves or radii of curvature at the transition regions or junction 212c between the outer end portion 212a and the cylindrical wall or portion 212b, and preferably has generally smooth transition curves or radii of curvature at the transition regions or junction 212d between the conical diverter 216 and the outer end portion 212a. The smooth radii of curvatures at the transition regions 212c, 212d provide a substantially smooth transition for the air flow as the air flows along the conical diverter 216 and as the air is diverted radially outward toward and through the smaller, radially spaced apart discharge holes 218. Thus, the silencer device 210 reduces turbulence in the air flow to reduce the noise generated by the flow of air out of the venturi device.

Cylindrical wall or portion 212b also functions to attach the silencer device 210 to the body of the vacuum device. In the illustrated embodiment of FIGS. 4-6, cylindrical portion 212b of housing 212 is formed to receive a narrowed portion 120a of the body 120 at the discharge end 128a of the venturi device 128. The housing 212 of silencer 210 may be press fit over the narrowed end portion 120a, or may be otherwise attached or secured to the body 120 of the vacuum cup assembly and generally at or near the discharge end of the venturi device or nozzle.

The cavity or chamber 214, the conical-shaped diverter 216 and the curved transitional regions 212c, 212d at the outer end portion 212a of the silencer 210 function to reduce turbulence and absorb some of the noise as the air flows from the discharge end 128*a* of the venturi 128 through the cavity 214 and out the discharge openings 218. The holes 218, although relatively small, are preferably large enough to allow most debris that may flow through the venturi to pass therethrough, so that the holes limit or substantially preclude obstruction of the air flow through the silencer. Thus, the silencer device of the present invention may achieve reduced noise levels during operation of the air supply and venturi device, while limiting obstruction of the air flow through the silencer device. The present invention thus provides an enhanced silencer over known or conventional types of silencers, which typically include a screen or filter element that is prone to dogging or becoming at least partially obstructed by debris during use.

Therefore, the vacuum cup assembly of the present invention may be engaged with an object and a vacuum or partial vacuum may be created or generated within the vacuum cup to substantially seal the vacuum cup to the object surface. The vacuum cup assembly, and the object substantially sealed thereto, may then be moved to a desired location. When at the targeted destination, the vacuum source or air supply may be deactivated to release or vent the vacuum within the assembly so as to readily release the object from the vacuum cup assembly.

The vacuum cup assembly of the present invention thus utilizes a single air line or hose or input and provides both vacuum or suction for sealing against and lifting panels or objects and venting for removal or blow off of panels or objects. The pressurized air enters the inlet or input port and passes through the venturi nozzle to create at least a partial vacuum at the vacuum cup and within the vacuum passageway of the body. During operation of the pressurized air supply, a small amount of pressurized input air is diverted to an area or chamber at or above a movable or flexible sealing element, such as a diaphragm or a piston element. The diverted pressurized air pushes or urges the sealing element downward or toward and against another sealing element (such as an outer portion of the body or a sealing ring or the like) to substantially seal or close the vacuum passageway (or otherwise substantially isolate the vacuum passageway from the atmosphere at the vacuum device), allowing the vacuum to be created in the vacuum passageway and at the vacuum cup. Thus, when the diverted input air is providing pressure above or outside of the first or movable sealing element, the sealing element remains substantially sealed within the vacuum passageway, such that there is a vacuum generated at the vacuum passageway at or below or inside of the sealing element (when the vacuum cup is engaged with an object).

When the venturi input air is reduced or shut off, the diverted input air at the outer end or side of the sealing element is reduced or eliminated, thereby allowing the biasing element or spring to move or push or urge the movable or flexible sealing element away from the other sealing element or ring or port to disengage the sealing elements and, thus, to vent the vacuum passageway to atmosphere. When the sealing elements are disengaged, the atmospheric pressure can rapidly enter the vacuum passageway and the vacuum cup, thereby relieving substantially all the vacuum within the vacuum cup and vacuum passageway and releasing or assisting in releasing the panel or object from the vacuum cup. Although shown and described as being implemented with a vacuum cup for sealing the vacuum cup relative to an object, the automatic release venturi device or vacuum device of the present invention may be suitable for use in other material handling applications that may otherwise handle objects or material by generating a vacuum when a pressurized air supply is activated and automatically release or vent the vacuum when the pressurized air supply is deactivated, while remaining within the spirit and scope of the present invention.

Therefore, the auto-release venturi device or vacuum device of the present invention provides a vacuum or partial vacuum that may be readily applied to a vacuum cup to substantially seal the vacuum cup to an object, and that may be readily and automatically vented to atmosphere to release the object from the vacuum cup. The sealing and venting device or assembly or element substantially seals the vacuum passageway when the vacuum source is activated to allow the pneumatic device or pressurized air supply to generate or create a vacuum or partial vacuum at the vacuum cup. The sealing and venting device is readily and automatically disengaged when the pneumatic device is deactivated to substantially vent the vacuum passageway to atmosphere to release the object from the vacuum cup.

The movable sealing element or membrane or piston element of the venting device may be engaged against a second sealing element or venting port or body or sealing ring or the like (which may be substantially fixed or non-moving relative to the vacuum device body) in response to the diverted pressurized air provided to the movable sealing element at an opposite side of the sealing element from the vacuum passageway rind vacuum device or venturi, such that the pressure differential at the sealing element causes the movable sealing element to substantially seal or close the vacuum passageway. When the pressurized air supply is reduced or deactivated and the diverted pressurized air is thus reduced or eliminated, the movable sealing element may disengage from the second sealing element or body or sealing ring or otherwise move or flex to open or vent the vacuum passageway to atmosphere, such as in response to the biasing element. The vacuum at the vacuum passageway and vacuum cup thus may be readily vented to atmosphere to release the vacuum cup from the object at the desired or targeted destination or location. Preferably, the body of the vacuum device comprises a unitarily formed device, with the vacuum passageway, the venturi passageway, the diverting passageway, and the venting passageway formed or bored at least partially therethrough, and with the sealing elements disposed at or within the body of the vacuum device, such that the vacuum device comprises an integral vacuum device with the sealing element and diverting passageway incorporated or integrated at or in the body of the vacuum device.

Changes and modifications to the specifically described embodiments may be carried out without departing from the principles of the present invention, which is intended to be limited only by the scope of the appended claims as interpreted according to the principles of patent law.

The embodiments of the invention in which an exclusive property is claimed are defined as follows:

1. An automatic release vacuum device for a material handling system, the automatic release vacuum device comprising:

a one-piece body adapted to connect to a pressurized air supply, the one-piece body including a vacuum passageway and a venting element the vacuum passageway operable to vent to atmosphere through the venting element;

a vacuum generating device housed in the one-piece body;

a piston element disposed in the one-piece body, the piston element including a desired shape including an edge surface that defines a radial periphery of the desired shape and a sealing element, the piston element has a sealing position wherein the sealing element and the piston element edge surface, that defines the radial periphery of the desired shape, engage to close off the vacuum passageway to atmosphere and, in turn, closing the venting element and a venting position wherein the vacuum passageway is open to atmosphere; and when the pressurized air supply is activated to supply pressurized air to the vacuum generating device, the piston element is moved into the sealing position and at least a partial vacuum is generated in the vacuum passageway.

2. The automatic release vacuum device of claim 1, further comprising a biasing element housed in the one piece body, wherein the biasing element biases the piston element toward the venting position.

3. The automatic release vacuum device of claim 1, further comprising a vacuum cup configured to engage an object, the vacuum cup configured to substantially seal against the object when the pressurized air is supplied to the vacuum generating device and the piston element is in the sealing position.

4. The automatic release vacuum device of claim 1, wherein the vacuum generating device is a venturi nozzle.

5. The automatic release vacuum device of claim 4, wherein air moves from the vacuum passageway into the venturi nozzle via at least one vacuum port of the venturi nozzle to generate the at least a partial vacuum when the piston element is in the sealing position and pressurized air is supplied to the venturi nozzle.

6. A vacuum cup assembly of a material handling system, the vacuum cup assembly comprising:
   a vacuum device body adapted to connect to a pressurized air supply, the vacuum device body including a venting element;
   a venturi nozzle housed in the vacuum device body;
   a piston element housed in the vacuum device body, the piston element including a desired shape including an edge surface that defines a radial periphery of the desired shape, the piston element coupled with a sealing element, the piston element having a sealing position and a venting position;
   a biasing element biasing the piston element toward the venting position;
   a vacuum cup in fluid communication with the vacuum device body, the vacuum cup configured to engage an object; and
   when the pressurized air supply is activated, the pressurized air moves the piston element to the sealing position wherein the sealing element coupled with the piston element edge surface, that defines the radial periphery of the desired shape, engage closing fluid communication between the vacuum cup and the venting element and, in turn, closing the venting element and the venturi nozzle generates a vacuum so that the vacuum cup substantially seals against the object, and when the piston element is in the venting position fluid communication is open between the vacuum cup and the venting element and the venting element is operable to substantially vent the vacuum, the vacuum cup can disengage from the object.

7. The automatic release vacuum device of claim 6, wherein the vacuum device body is a unitary body.

8. An automatic release vacuum device for a material handling system, the automatic release vacuum device comprising:
   a unitary body adapted to connect to a pressurized air supply, the unitary body including a vacuum passageway;
   a piston element having a desired shape and an edge surface that defines a radial periphery of the desired shape, the piston element is disposed in the unitary body and includes a sealing element, the piston element movable in a first direction and a second direction and when the pressurized air supply is activated the pressurized air urges the piston element in the first direction toward a sealing position, the sealing element engaging the piston element edge surface, that defines the radial periphery of the desired shape, blocking entry of ambient air from atmosphere into the vacuum passageway;
   a diverter passageway to divert a portion of the pressurized air to the piston element to urge the piston element toward the sealing position when the pressurized air supply is activated;
   a venturi nozzle generating at least a partial vacuum in the vacuum passageway when the pressurized air is activated and when the piston element is in the sealing position; and
   a biasing element biasing the piston element in the second direction and when the pressurized air supply is deactivated the biasing element biases the piston element in the second direction toward a venting position allowing entry of ambient air from atmosphere into the vacuum passageway and when the piston element is in the venting position the at least partial vacuum is destroyed.

9. The automatic release vacuum device of claim 8, wherein air moves from the vacuum passageway into the venturi nozzle via at least one vacuum port of the venturi nozzle to generate the at least a partial vacuum when pressurized air is supplied to the venturi nozzle and when the piston element is in the sealing position.

10. The automatic release vacuum device of claim 8, further comprising a venting element, the vacuum passageway being operable to vent to atmosphere through the venting element when the piston element is in the venting position.

11. The automatic release vacuum device of claim 8, further comprising a vacuum cup configured to engage an object, the vacuum cup adapted to substantially seal against the object when the pressurized air is supplied to the vacuum generating device and when the piston element is in the sealing position.

* * * * *